United States Patent
Kleinpenning

(10) Patent No.: US 9,019,729 B2
(45) Date of Patent: Apr. 28, 2015

(54) CONTROLLER FOR A SWITCHED MODE POWER CONVERTER

(75) Inventor: Jeroen Kleinpenning, Lent (NL)

(73) Assignee: NXP B.V., Eindhoven (NL)

( * ) Notice: Subject to any disclaimer, the term of this patent is extended or adjusted under 35 U.S.C. 154(b) by 68 days.

(21) Appl. No.: 13/442,860

(22) Filed: Apr. 10, 2012

(65) Prior Publication Data

US 2013/0094247 A1    Apr. 18, 2013

(30) Foreign Application Priority Data

Apr. 14, 2011    (EP) .................................... 11250469

(51) Int. Cl.
*H02M 3/335*    (2006.01)
*H02M 3/24*    (2006.01)

(52) U.S. Cl.
CPC ............ *H02M 3/24* (2013.01); *H02M 3/33523* (2013.01)

(58) Field of Classification Search
USPC ....................... 363/21.12–21.13, 21.15–21.18
See application file for complete search history.

(56) References Cited

U.S. PATENT DOCUMENTS

| | | | |
|---|---|---|---|
| 5,202,617 A | 4/1993 | Nor | |
| 6,972,969 B1 | 12/2005 | Shteynberg et al. | |
| 7,259,972 B2 | 8/2007 | Yang | |
| 7,505,287 B1 | 3/2009 | Kesterson | |
| 7,622,898 B2 * | 11/2009 | Shimizu et al. ............... | 320/166 |
| 7,911,814 B2 * | 3/2011 | Tao et al. .................... | 363/21.12 |
| 2005/0088161 A1 * | 4/2005 | Balakrishnan et al. ........ | 323/284 |
| 2006/0158909 A1 | 7/2006 | Hawley | |
| 2007/0108955 A1 | 5/2007 | Currell | |
| 2008/0136392 A1 | 6/2008 | Balakrishnan et al. | |
| 2008/0259651 A1 * | 10/2008 | Huynh et al. ............... | 363/21.12 |
| 2009/0059632 A1 * | 3/2009 | Li et al. ......................... | 363/124 |
| 2009/0201705 A1 | 8/2009 | Murata et al. | |
| 2010/0128501 A1 * | 5/2010 | Huang et al. ............... | 363/21.16 |
| 2010/0164455 A1 | 7/2010 | Li et al. | |
| 2010/0208500 A1 * | 8/2010 | Yan et al. .................... | 363/21.12 |
| 2011/0157924 A1 * | 6/2011 | Huynh ....................... | 363/21.15 |

OTHER PUBLICATIONS

Extended European Search Report for European Patent Appln. No. 11250469.1 (Jan. 4, 2012).

* cited by examiner

*Primary Examiner* — Matthew Nguyen
*Assistant Examiner* — Henry Lee, III

(57) ABSTRACT

A switched mode power converter controller outputs a switch control signal for a switch, receives sensed voltage and primary current input signals, and includes a constant current mode controller to process voltage input signals and generate output control signals for controlling converter peak current and/or switching frequency operational; a constant voltage mode controller processes the voltage input signal and generates output control signals for converter peak current and/or switching frequency operational parameters; a primary peak current adjuster processes primary current input and output control signals from the current and voltage mode controllers to configure the switch control signal to turn off the switch; a switching frequency adjuster processes output control signals from the current and voltage controllers to configure the switch control signal to turn on the switch. The constant current controller is enabled if the constant voltage controller signals represent operation with maximum peak current and switching frequency.

20 Claims, 4 Drawing Sheets

CONTROLLER FOR A SWITCHED MODE POWER CONVERTER

CROSS-REFERENCE TO RELATED APPLICATIONS

This application claims the priority under 35 U.S.C. §119 of European patent application no. 11250469.1, filed on Apr. 14, 2011, the contents of which are incorporated by reference herein.

The present disclosure relates to the field of controllers for switched mode power converters, in particular, although not exclusively, to a controller for operating the switched mode power converter in a constant current mode of operation and a constant voltage mode of operation.

It is known to use switched mode power supply (SMPS) converters in adapters and low power converters. Such converters can be used to provide a maximum output current that is regulated over an output voltage range, which may be required for battery charging as used in mobile telephones, electric shavers and other handheld applications; for light emitting diode (LED) applications that can provide constant light output without dimming; for a defined maximum dissipation in the secondary diode; and for short circuit protection for wall-plug chargers with an open connector.

A commonly used SMPS topology that can provide mains isolation for battery chargers is the flyback converter.

The listing or discussion of a prior-published document or any background in the specification should not necessarily be taken as an acknowledgement that the document or background is part of the state of the art or is common general knowledge.

According to a first aspect of the invention, there is provided a controller for a switched mode power converter having a switch, wherein the switched mode power converter can operate in a constant current and a constant voltage mode of operation, wherein the controller is configured to output a switch control signal for the switch and receive:
  a sensed voltage input signal; and
  a primary current input signal;
  wherein the controller comprises:
  a constant current mode controller configured to process the sensed voltage input signal and generate output control signals for controlling one or both of peak current and switching frequency operational parameters of the switched mode power converter;
  a constant voltage mode controller configured to process the sensed voltage input signal and generate output control signals for controlling one or both of the peak current and switching frequency operational parameters of the switched mode power converter;
  a primary peak current adjuster configured to process the primary current input signal and one or both of the output control signals from the constant current mode controller and constant voltage mode controller in order to configure the switch control signal to turn off the switch;
  a switching frequency adjuster configured to process one or both of the output control signals from the constant current mode controller and constant voltage mode controller in order to configure the switch control signal to turn on the switch;
  wherein the controller is configured to enable the constant current mode controller if the output control signals of the constant voltage mode controller represent operation with peak current and switching frequency at maximum values.

Such a controller can provide an advantageous way of transitioning between the constant current mode of operation and the constant voltage mode of operation as the transition occurs for maximum values of the peak current and switching frequency, thereby defining a maximum output power of the converter. Controlling the transition in relation to output power in this way can be achieved with few additional components in a controller integrated circuit and without requiring any additional pins on the controller integrated circuit (IC).

The constant current mode controller may be configured to generate output control signals when it is enabled. In other examples, the constant current mode controller may be configured to generate output control signals that set or modify one or both of peak current and switching frequency operational parameters when it is enabled. If the constant current mode controller is not enabled, it may be configured to generate output control signals that do not set or modify one or both of peak current and switching frequency operational parameters.

The controller may be configured to enable the constant voltage mode controller if the output control signals of the constant current mode controller represent operation with peak current and switching frequency at maximum values. This may be in addition to, or instead of, the controller being configured to enable the constant current mode controller if the output control signals of the constant voltage mode controller represent operation with peak current and switching frequency at maximum values The primary peak current adjuster may be configured to provide the switch control signal such that it is configured to turn off the switch in order to provide operation with a constant peak current at the maximum value. In some embodiments, the primary peak current adjuster may not be required if the converter is controlled with a constant primary peak current.

The switching frequency adjuster may be configured to provide the switch control signal such that it is configured to turn on the switch with a constant frequency at the maximum value. In some embodiments, the switching frequency adjuster may not be required if the converter is controlled with a constant switching frequency.

The controller may be configured to enable the constant current controller when the output control signals of the constant voltage mode controller represent operation with the switching frequency and primary peak current are at their maximum values, and the sensed voltage input signal drops to a CC threshold level. The CC threshold level may be below the voltage level when the switched mode power converter is operating in constant voltage mode. In this way a transition mode is provided between the constant current mode of operation and the constant voltage mode of operation.

The controller may be configured to operate the switched mode power converter with the maximum values for the switching frequency and primary peak current at the transition between the constant current mode of operation and the constant voltage mode of operation. In this way, a transition mode is provided whereby the maximum output power is maintained, and one of the output current and output voltage is adjusted to its constant value for subsequent operation in the appropriate constant mode The switched mode power converter may also operate in a regulated current mode of operation. The controller may comprise:
  a regulated current mode controller that comprises:
    the constant current mode controller configured to generate output control signals for controlling one or both of the peak current and switching frequency operational parameters of the switched mode power converter such that the output current is maintained substantially constant for sensed voltage input signal levels between the CC threshold level and a fold-back threshold level; and a fold-back controller configured to generate output control signals for controlling one or both of the peak current and switching frequency operational parameters of the switched mode power converter such that the output current is reduced as the sensed voltage input signal reduces for sensed voltage input signal levels below the fold-back threshold level.

Such a regulated current mode controller can enable the switched mode power converter to provide fold-back operation, which may be required to satisfy some standards or may be required in conditions where the output is continuously too low, such as for a short-circuit at the output.

The constant current mode controller may be configured to generate the output control signal for the switching frequency adjuster and the output control signal for the primary peak current adjuster such that the switching frequency is adjusted for switching frequency values that are above a switching minimum value and the primary peak current is kept constant. In this way, it can be ensured that the switching frequency does not drop to an audible level, as defined by the switching minimum value.

The constant current mode controller may be configured to generate the output control signal for the switching frequency adjuster and the output control signal for the primary peak current adjuster such that the switching frequency is kept constant at the switching minimum value and the primary peak current is adjusted when the switching frequency reaches the switching minimum value. In some examples it can be considered more efficient, in some embodiments computationally more economical, to adjust the switching frequency in preference to the peak current. Therefore, the switching frequency can be adjusted for higher sensed voltage levels when operating in constant current mode.

The switching frequency adjuster may be configured to set the frequency of the switch control signal. The primary peak current adjuster may be configured to set the duty cycle or the on-time (because switching frequency is variable) of the switch control signal or set the sense level for the primary peak current.

The primary peak current adjuster may be configured to adjust the peak current in accordance with the output control signal from the constant voltage controller when the switched mode power converter operates in a constant voltage mode of operation. The output control signal of the constant voltage mode controller may represent operation with maximum primary peak current, and the output control signal of the constant current mode controller may represent the required deduction from the maximum primary peak current value in order to operate in constant current mode.

The primary peak current adjuster may be configured to adjust the peak current in accordance with both of the output control signal from the constant current controller and the output control signal from the constant voltage controller when the switched mode power converter operates in a constant current mode of operation. Such a converter can be considered advantageous as it may not be necessary to disable the constant voltage controller when operating in the constant current mode of operation.

The primary peak current adjuster may comprise a first variable current source that is controllable by the constant voltage controller and a second variable current source that is controllable by the constant current controller. The first and second variable current sources may be in parallel with each other with one common output. The current from the second variable current source may be configured to be subtracted from the current of the first variable current source in order to adjust the primary peak current in the constant current mode of operation.

The switching frequency adjuster may be configured to adjust the switching frequency in accordance with the output control signal from the constant voltage controller when the switched mode power converter operates in a constant voltage mode of operation.

The switching frequency adjuster may be configured to adjust the switching frequency in accordance with both of the output control signal from the constant voltage controller and the output control signal from the constant current controller when the switched mode power converter operates in a constant current mode of operation. Such a converter can be considered advantageous as it may not be necessary to disable the constant voltage controller when operating in the constant current mode of operation. The output control signal of the constant voltage mode controller may represent operation with maximum switching frequency, and the output control signal of the constant current mode controller may represent the required deduction from the maximum switching frequency value in order to operate in constant current mode.

The switching frequency adjuster may comprise a first variable current source that is controllable by the constant voltage controller and a second variable current source that is controllable by the constant current controller. The first and second variable current sources may be in parallel with each other with one common output. The current from the second variable current source may be configured to be subtracted from the current of the first variable current source in order to adjust the primary peak current in the constant current mode of operation.

The constant current mode controller may be configured to provide output control signals that prevent the primary peak current from dropping to zero at a sensed voltage input of zero Volts. Such a minimum level may be used to ensure that the controller can start up correctly.

According to another aspect of the invention, there is provided a method of operating a switched mode power converter comprising:

operating the switched mode power converter in a constant current mode of operation by adjusting one or both of the peak current and switching frequency operational parameters of the switched mode power converter;

changing the mode of operation of the switched mode power from the constant current mode of operation to a constant power mode of operation when the peak current and switching frequency operational parameters reach maximum values, wherein operating the switched mode power converter in the constant power mode of operation comprises applying the maximum values for both the peak current and switching frequency operational parameters; and changing the mode of operation of the switched mode power from the constant power mode of operation to a constant voltage mode of operation when the output voltage reaches the constant voltage level, wherein operating the switched mode power converter in the constant voltage mode of operation comprises adjusting one or both of the peak current and switching frequency operational parameters of the switched mode power converter.

The step of changing the mode of operation from the constant current mode of operation to the constant power mode of operation may be performed when the load experienced by the switched mode power converter in constant current mode of operation requires operation at maximum peak current and switching frequency values.

The step of changing the mode of operation of the switched mode power from the constant power mode of operation to the constant voltage mode of operation may be performed when the load experienced by the switched mode power converter requires operation that generates the constant output voltage level with peak current and switching frequency below the maximum values.

There may be provided a switched mode power converter comprising any controller disclosed herein.

There may be provided a battery charger comprising any switched mode power converter or controller disclosed herein.

There may be provided a computer program, which when run on a computer, causes the computer to configure any apparatus, including a circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

A description is now given, by way of example only, with reference to the accompanying drawings, in which.

One or more embodiments of the invention relate to a controller for a switched mode power converter. The controller can generate a switch control signal for the switched mode power converter such that the output of the switched mode power converter can operate in a constant current and a constant voltage mode of operation. The controller can process a sensed voltage input signal and a primary current input signal in order to control one or both of (i) the peak current at the primary side of the switched mode power converter; and (ii) the switching frequency in order to operate in constant current or constant voltage mode. In this way, the switched power converter can be controlled such that maximum values for (i) and (ii) are not exceeded at the transition between constant current mode and constant voltage mode and therefore a maximum output power is not exceeded. Transitioning between operational modes in this way can be implemented with relatively few additional integrated components, and in some embodiments without requiring an additional pin on the controller integrated circuit (IC).

Figure 1:
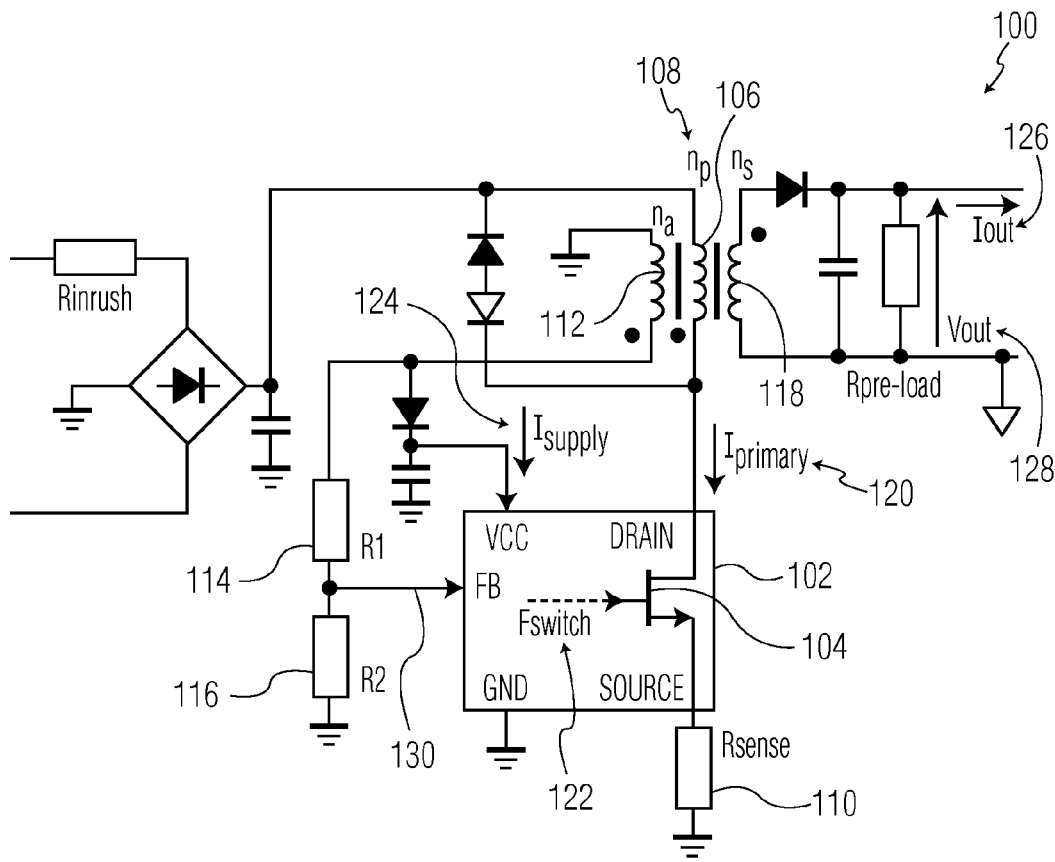
FIG. 1 illustrates a known flyback converter.

FIG. 1 illustrates a known flyback converter 100. The flyback converter 100 includes a controller 104, which in this example also includes the switch 104 of the flyback converter 100. Some of the components of the flyback converter 100 that are well known in the art will not be described here.

As is known in the art, the switch 104 is connected in series between the primary winding 106 of a transformer 108 and a sense resistor 110. The other terminal of the sense resistor 110 is connected to ground.

The transformer 108 includes an auxiliary winding 112 that is used to provide a supply voltage and current to the controller 102. This supply current is illustrated as Isupply 124 in FIG. 1, and is provided to the VCC pin of the controller 102. In addition, a resistive divider, comprising two resistors R1 114 and R2 116, is connected in series with the auxiliary winding 112 in order to provide a sensed voltage signal 130 to the FB pin of the controller 120. The sensed voltage signal 130 is provided from the junction of the two resistors R1 114, R2 116, and is representative of the output of the flyback converter due to the magnetic coupling between the auxiliary winding 112, the primary winding 106, and secondary winding 118 of the transformer 108.

The following signals are also identified in FIG. 1:

$I_{primary}$ 120, which represents the current flowing through the primary winding 112 and also through the switch 104;

$F_{switch}$ 122, which represents the frequency with which the controller 102 operates the switch 104;

$I_{out}$ 126, which represents the output current of the flyback converter 100; and $V_{out}$ 128, which represents the output voltage of the flyback converter 100.

One or more embodiments disclosed herein relate to a controller 102 for a flyback converter 100 that can improve the performance of the converter 100. Embodiments of the invention can use little or minimal additional circuitry, and can use the maximum output power level and the sensed feedback voltage 130 at the FB pin of the controller 102 as two reference parameters for controlling the output of the converter.

Figure 2:
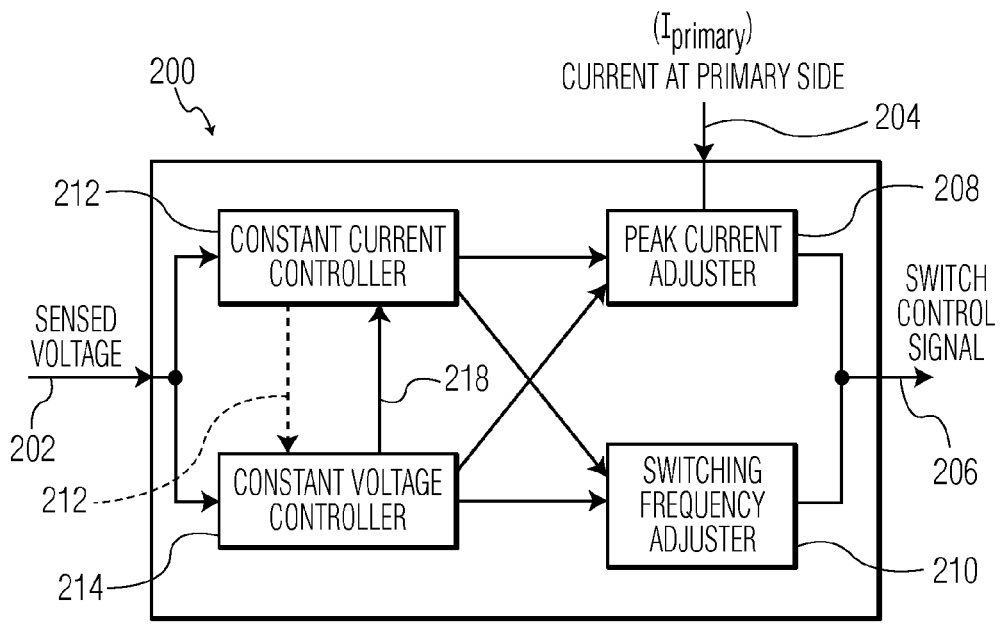
FIG. 2 illustrates a controller according to an embodiment of the invention.

FIG. 2 illustrates a controller 200 according to an embodiment of the invention. The controller 200 could be part of the controller 102 of FIG. 1 in order to provide a converter according to an embodiment of the invention. The switch is not shown as part of the controller 200 of FIG. 2, although in other embodiments a switch such as a field effect transistor (FET) could be included as part of the controller 200.

The controller 200 receives a sensed voltage input signal 202, which could be the signal ($V_{FB}$) 130 provided by the resistive divider 114, 116 of FIG. 1, and a primary current input signal 204 representative of the current at the primary side of the transformer ($I_{primary}$). As shown in FIG. 1, the primary current input signal 204 can be taken as the current flowing through the sense resistor (Rsense 110) at the primary side of the transformer 108. The controller 200 outputs a switch control signal 206 that can be used to operate the switch of a converter.

In this example, the sensed voltage input signal 202 is the value of $V_{FB}$ that has been sensed and sampled at the end of the secondary stroke near the end-of-conduction of the switching cycle. At this moment in the switching period, the sensed voltage on the FB pin, which will be referred to as $V_{FBS}$, is a good representation of the secondary voltage at the output. At the end of the secondary stroke, $V_{FBS}$ may be considered as a good value because it is not significantly influenced by any ringing at the drain caused by the current commutation, it is sampled at a time with minimum forward voltage of the secondary output diode, and with minimum voltage drop across the copper resistance of tracks between components, the diode resistance, and over the equivalent series resistance (ESR) of the secondary output capacitor. An assumption is made that the voltage dropped across the output diode ($V_{diode}$) is much lower than the output voltage ($V_{out}$). This can be particularly true when converters that require high efficiency are used, for example a converter with a 5V output voltage that uses a 0.3V low voltage Schottky diode.

The approximate relationship between the sampled value of the sensed voltage signal ($V_{FBS}$) and the output voltage ($V_{out}$) of the converter is:

$$V_{out} = V_{FBS} \cdot n_s/n_a \cdot (R1+R2)/R2$$

Where:
$n_s$ is the number of turns on the secondary winding;
$n_a$ is the number of turns on the auxiliary winding; and
R1 and R2 are the values of the resistors in the resistive bridge 114, 116 shown in FIG. 1.

When the flyback converter 100 of FIG. 1 operates as a power source in discontinuous conduction mode (DCM), each switching cycle delivers an energy package of $\frac{1}{2} \cdot L_p \cdot I_{peak}^2$ to the secondary winding 118 (the output) and the auxiliary winding 112 of the transformer 108 as shown in FIG. 1.

The converter may have maximum values for $I_{peak-max}$ and $f_{switch-max}$, which defines a maximum power that can be delivered. The maximum value for the primary current ($I_{peak-max}$) and switching frequency ($f_{switch-max}$) may be considered as end values of control ranges that are stored on the controller IC. The value for the peak primary current that is compared with $I_{peak-max}$ may be defined by a user in some examples by setting the value of an external sense resistor. Further details are provided below. The maximum transferred power is:

$$P_{out-max} = \frac{1}{2} \cdot L_{peak-max}^2 \cdot f_{switch-max}$$

Where:
$I_{peak-max}$ represents the maximum value for the peak primary current;
$f_{switch-max}$ represents the maximum value for the switching frequency; and
$L_p$ is the inductance of the primary winding.

Substituting the above approximation of $C_{out}$ into the maximum power equation gives:

$$I_{out} = P_{out-max}/V_{out}$$

$$I_{out} = \frac{1}{2} \cdot L_p \cdot I_{peak-max}^2 \cdot f_{switch-max}/V_{out}$$

$$I_{out} = \frac{1}{2} \cdot L_p \cdot I_{peak-max}^2 \cdot f_{switch-max}/(V_{FBS} \cdot n_s/n_a \cdot (R1+R2)/R2))$$

In order to maintain a constant output current as $V_{FBS}$ changes, then either or both of the following expressions can be regulated so that they are constant:

$$f_{switch-max}/V_{FBS}; \text{ and/or}$$

$$I_{peak-max}^2/V_{FBS}$$

It will be appreciated that all of the other parameters in the above equation (that is $L_p$, $n_s$, $n_a$, R1 and R2) are converter constants.

The switch control signal 206 that is output by the controller 200 can be provided to the gate of a MOSFET in order to control the conductivity of the conduction channel of the MOSFET (between the drain and the source). As indicated above, in some examples, the switch (not shown) may be part of the controller 200, and the controller may have two pins that correspond to each terminal of the switch (such as the drain and source pins of the controller 102 that are shown in FIG. 1).

The controller 200 includes a peak current adjuster 208 that can set at least one parameter of the switch control signal 206 in order to operate the switch such that the peak current through the primary side of the transformer is adjusted. The controller 200 also includes a switching frequency adjuster 210 that can set at least one parameter of the switch control signal 206 in order to adjust the switching frequency with which the switch is operated. In one example, the switching frequency adjuster 210 may be used to directly influence the frequency of the switch control signal 206, which may involve setting when the switch should be turned on, and the peak current adjuster may be used to influence the sense level for the primary peak current or on-time of the switch control signal 206, which may involve setting when the switch should be turned off. As discussed above, the peak primary current and/or switching frequency can be adjusted in order to change the output power and maintain a constant output current.

The controller 200 includes a constant current mode controller 212 that is configured to provide control signals to the peak current adjuster 208 and switching frequency adjuster 210 when the converter is operating in a constant current mode of operation. Similarly, the controller 200 includes a constant voltage mode controller 214 that is configured to provide control signals to the peak current adjuster 208 and switching frequency adjuster 210 when the converter is operating in a constant voltage mode of operation.

The peak current adjuster 208 also receives the primary current input signal ($I_{primary}$) 204 such that the current through the primary side is made available to the controller 200.

In this example, the constant voltage controller 214 provides an enable signal 218 to the constant current controller 212 indicative of whether or not the constant voltage controller 214 provides output control signals representative of operation with a maximum switching frequency and a maximum peak primary current. In this way, the transition from constant voltage mode to current mode occurs when the peak current ($I_{peak}$) and peak, switching frequency ($f_{switch}$) are operating at their maximum values. The constant voltage mode controller 214 may inherently know when it is causing the peak current adjuster 208 and the switching frequency adjuster 210 to use these maximum values, and therefore can set the enable signal 218 accordingly. In this example, the constant voltage controller 214 may not require disabling when the flyback converter is operating in a constant current mode of operation.

The sensed voltage input signal 202 is also provided to the constant current controller 212 and the constant voltage controller 214. The constant current controller 212 can be enabled when both (i) the sensed voltage input signal 202 is below a constant current (CC) threshold level, and (ii) the enable signal 218 is indicative of the switched mode power converter operating with maximum switching frequency and maximum peak primary current.

In other examples, the constant current mode controller 212 may provide the constant voltage controller 214 with an enable signal 220, which may be in addition to, or instead of, the enable signal 218 for the constant current controller 212.

In this example, the constant voltage mode controller 214 provides the enable signal 218 to the constant current controller 212. In other examples, the functionality for setting the enable signal 218 may be provided by one or both of the constant current controller 212 and the constant voltage controller 214, or may be provided by a separate component. In such examples it may be necessary to feedback the peak current value and switching frequency as the in-use values for these parameters may not be readily available.

For embodiments of the invention that relate to battery chargers, for example switched mode power converters that are used to charge mobile telephones and the like, it is known in the art for the device that is being charged to change the load impedance that is presented to the switched mode power converter in order to control whether it is to be charged with a constant current or a constant voltage. For example, when the battery is nearly fully charged it may draw a constant voltage from the charger, and when the battery is nearly empty it may draw a constant current from the charger. There will be a point at which the charger transitions from constant current to constant voltage mode.

Example operation of the controller 200 of FIG. 2 will now be described with reference to FIG. 3, which shows the relationship between the sensed voltage at the end of the secondary stroke ($V_{FBS}$) on the vertical axis and the output current ($I_{out}$) on the horizontal axis.

As an example, a flyback controller for 5 W adapters for global mains input can provide a constant voltage mode of operation at 5V and a constant current mode of operation at 1 A.

As discussed above, the converter has a maximum power that it can deliver, which is defined as:

$$P_{out\text{-}max} = \tfrac{1}{2} \cdot L_p \cdot I_{peak\text{-}max}^2 \cdot f_{switch\text{-}max}$$

If the output current and sensed voltage are plotted against each other on a graph, the maximum power that can be delivered can be considered as a constant power hyperbola 308. Any position on the constant power hyperbola 308 represents operation with the maximum peak primary current ($I_{peak\text{-}max}$) and maximum switching frequency ($f_{switch\text{-}max}$).

The output current for an operating point on the power hyperbola is:

$$I_{out} = P_{out\text{-}max} / V_{out}$$

If the converter is operating in a constant output current mode of operation, then the output power can be reduced in order to maintain a constant output current for a decreasing output voltage as the load impedance that is presented to the converter decreases. It will be appreciated from the above equations that the output power level can be reduced by decreasing (i) $f_{switch}$, or (ii) $I_{peak}$; or (iii) $f_{switch}$ and $I_{peak}$.

Three threshold levels in the sensed voltage are shown on the vertical axis. These are: $V_{FBSCV}$ 302, which represents the desired sampled voltage when the converter is operating in a constant voltage mode of operation; $V_{FBSCC}$ 304, which represents the sampled voltage level at which the converter transitions to or from a constant current mode of operation and is an example of a CC threshold level discussed above; and UVLO 306, which represents a voltage lock out level. The UVLO level 306 defines a minimum value for the sampled voltage that can ensure that the controller can be supplied with sufficient voltage to operate correctly.

In one example, a device such as a mobile telephone may change the load impedance that it presents to a power converter so that it receives an appropriate current and power in accordance with a charge level of the battery.

Figure 3:
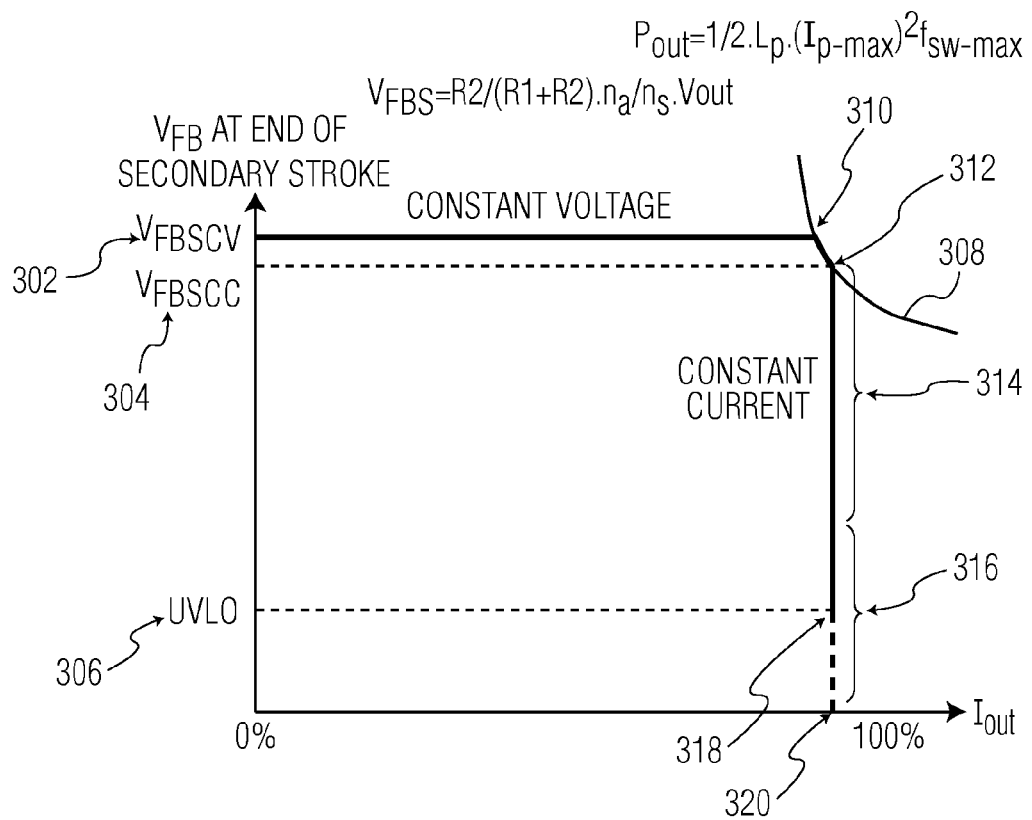
FIG. 3 illustrates graphically an example operation of the controller of FIG. 2.

The switch of the converter is operated such that the converter provides a constant output voltage level ($V_{FBSCV}$ 302) for current levels up until the maximum peak primary current and maximum switching frequency are reached, which is shown in FIG. 3 as the maximum power hyperbola 308. That is, the output current is allowed to increase in constant voltage mode up until it is not possible to deliver any more power. At this point, identified with reference 310 in FIG. 3, the output current cannot be further increased whilst staying in constant voltage mode without exceeding the maximum power 308. At point 310 the output current level is defined by the maximum power hyperbola 308, the primary peak current and switching frequency are at their maximum values, and the output current equals the maximum power divided by the output voltage.

As the load impedance presented to the converter continues to decrease when the converter is operating in constant voltage mode at maximum power, the converter is controlled such that the output current and output voltage continue along the maximum power hyperbola 308 from point 310 to point 312 with an increasing current and decreasing voltage. This may be considered as a maximum power mode of operation or a transition mode of operation. The output current is then allowed to increase until the output voltage meets the threshold level $V_{FBSCC}$ 304 for switching over to a constant current mode of operation. At the threshold level $V_{FBSCC}$ 304, the output current has the desired constant value. This changeover to constant current mode is identified with reference 312 in FIG. 3 and occurs when (i) the primary peak current and switching frequency are at their maximum values (and therefore maximum power is being delivered); and (ii) the sensed voltage at the end of the secondary stroke ($V_{FBS}$) is below a threshold level ($V_{FBSCC}$ 304).

The operation of an embodiment of the invention that is illustrated by FIG. 3 provides an operation margin between the end of the constant voltage mode 310 and the start of the constant current mode 312. In constant voltage mode the sensed voltage ($V_{FBS}$) is regulated to a reference value $V_{FBSCV}$ 302. The constant current mode is enabled once the sensed voltage ($V_{FBS}$) drops below a marginally lower $V_{FBSCC}$ threshold level 304. It will be appreciated that in other embodiments, depending upon the levels of the constant voltage and constant current that are required, as well as the maximum power 308 that can be delivered, the size of the difference between $V_{FBSCV}$ 302 and $V_{FBSCC}$ 304 could be larger or smaller than illustrated in FIG. 3.

When the converter is controlled so as to operate in constant current mode, and the output voltage reduces as the load impedance provided by the device continues to decrease, the output power must be reduced in order to maintain the constant output current. This is due to the well known relationship: P=I×V. As discussed in more detail above, the switching frequency $f_{switch}$ and/or the peak primary current $I_{peak}$ can be changed in order to adjust the output power.

In some examples, the contribution to the values for the switching frequency $f_{switch}$ and the peak primary current $I_{peak}$ that is made by components of the controller that relate to constant voltage operation still relates to the maximum values; components of the controller that relate to constant current operation are used to reduce the values of the switching frequency $f_{switch}$ and the peak primary current $I_{peak}$ from these maximum values.

In this example, as the sampled output voltage $V_{FBS}$ drops below the $V_{FBSCC}$ threshold level 304, the switching frequency $f_{switch}$ is reduced and scales down with $V_{FBS}$ for the constant output current to be maintained.

Rearranging the above equation that provides the relationship between $I_{out}$ and $f_{switch}$, and assuming that the peak primary current ($I_{peak\text{-}max}$) is kept constant when the switching frequency ($f_{switch}$) is regulated:

$$f_{switch} = I_{out} / (\tfrac{1}{2} \cdot L_p \cdot I_{peak\text{-}max}^2) \cdot (V_{FBS} \cdot n_s / n_a \cdot (R1+R2)/R2) = K_{Fsw} \cdot V_{FBS}$$

Where:
  $k_{Fsw}$ is a constant that represents all of the fixed parameters in the above equation.

The switching frequency $f_{switch}$ may be reduced until it reaches a switching minimum level. An example of the switching minimum level for the switching frequency $f_{switch}$ is the audible limit of the human ear, which may be considered as 20 kHz, or any value that is considered as practically inaudible The range of output voltages for which the switching frequency $f_{switch}$ is adjusted, that is up until $f_{switch}$ reaches the audible threshold level, is shown with reference 314 in FIG. 3.

As the output voltage reduces further, and the switching frequency $f_{switch}$ is at the audible limit, the primary peak current $I_{peak}$ is reduced instead of $f_{switch}$ in order to maintain the constant output current level.

Rearranging the above equation that provides the relationship between $I_{out}$ and $I_{peak}$, and assuming that the switching frequency ($f_{switch}$) is kept constant when the peak current ($I_{peak}$) is regulated:

$$I_{peak} = \sqrt{I_{out} \cdot (V_{FBS} \cdot n_2/n_a \cdot (R1 + R2)/R2))/\frac{1}{2} \cdot L_p \cdot f_{switch}} = k_{Ipk}\sqrt{V_{FBS}}$$

Where:
  $k_{Ipk}$ is a constant that represents all of the fixed parameters in the above equation.

Therefore $I_{peak}$ is scaled down with $\sqrt{V_{FBS}}$ in order to maintain constant output current. The range of output voltages for which the peak primary current $I_{peak}$ could be adjusted is shown with reference 316 in FIG. 3.

In this example, there is a limit to which the output voltage can be reduced, as defined by the threshold level UVLO 306. This threshold level UVLO 306 refers to the minimum supply voltage of the controller and is required to ensure that the controller operates correctly in steady-state operation. For example, and as shown in FIG. 1, the controller may be provided as a separate integrated circuit 102 that receives its supply voltage (Vcc) from an auxiliary winding of the transformer of the converter. This supply voltage (Vcc) must be kept above a minimum value; this minimum level is called the Under Voltage Lock Out level (UVLO) of the Vcc.

Operation of the converter below the threshold level UVLO 306 is shown with reference 318 in FIG. 3, at which point $f_{switch}$ and $I_{peak}$ have been reduced and discontinuous conduction mode (DCM) operation is maintained. Operation below UVLO occurs during start-up, which is a transition situation wherein the output voltage increases from 0V to a desired level above the level 306 that is related to the UVLO level. The controller can prevent $f_{switch}$ and $I_{peak}$ from being reduced to zero for guaranteed start-up from 0V output voltage.

The value for UVLO 306 may be set at a value that is lower than is likely to be required in steady-state use. For example, the constant current mode can be used when a battery has relatively little charge, and the UVLO threshold value 306 may represent operation at a sensed voltage level ($V_{FBS}$) that is below the voltage level that would be required for a flat battery. In one example, the UVLO threshold may represent an output voltage of 1V and a flat battery would present a load that would draw a constant current at a voltage level of 2V.

In some examples, it may be appropriate to define operation for zero output voltage, and hence zero sensed voltage $V_{FBS}$, such that the converter can operate with a minimum $I_{peak}$ current and enable start-up of the converter. This is shown with reference 320 in FIG. 3.

In some embodiments, it can be preferable to initially regulate $f_{switch\text{-}max}/V_{FBS}$ (as opposed to $I_{peak}$) from a maximum output voltage level ($V_{FBSCC}$ 304) in constant current mode such that the converter operates in a discontinuous conduction mode (DCM) of operation that is relatively close to a boundary conduction mode (BCM) of operation. This can improve efficiency.

Figure 4:
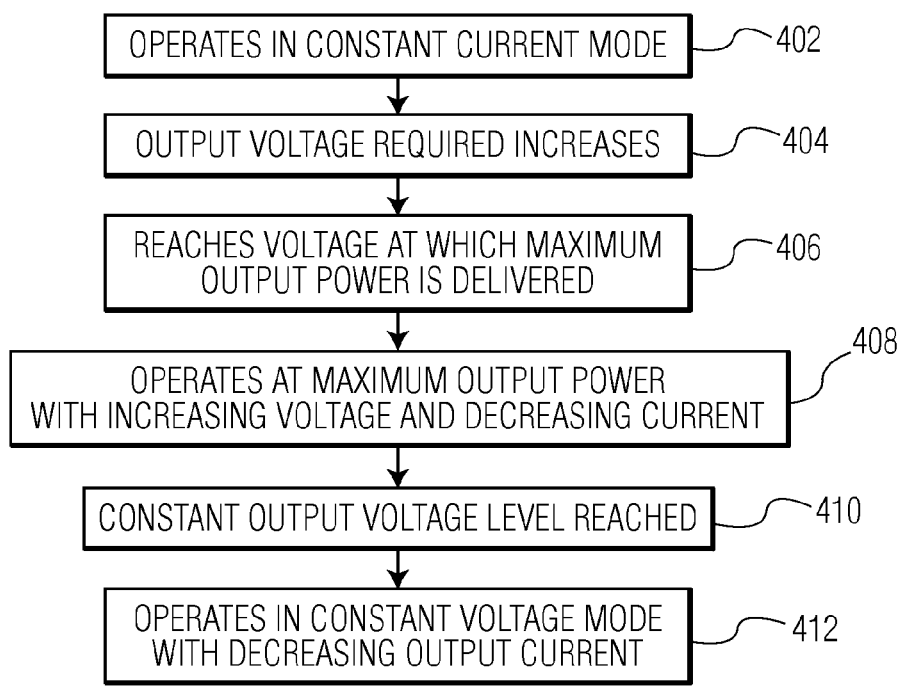
FIG. 4 shows a process flow that illustrates a method according to an embodiment of the invention.

FIG. 4 shows a process flow that illustrates a method according to an embodiment of the invention. The method provides an example of how a controller can control a switched mode power converter as it transitions from a constant current mode of operation to a constant voltage mode of operation.

The method starts at step 402 whereby the controller provides a switch control signal that causes the converter to operate in a constant current mode of operation.

During the constant current mode of operation, the output voltage may increase as the load impedance presented to the converter increases. This is step 404 of FIG. 4. The load impedance may be increased in this way as the charge on a battery is increased As the converter is operating in a constant current mode, it will be appreciated that the output power increases as the output voltage increases, and this can be achieved by increasing $I_{peak}$, $f_{switch}$, or both.

At step 406, the output power reaches a maximum value that has been defined for the converter as the values for $I_{peak}$ and $f_{switch}$ are at their maximum values.

At step 408, the controller operates the converter with the maximum values for $I_{peak}$ and $f_{switch}$, and the output current and output voltage are allowed to change as the load continues to increase in order to maintain the maximum value of output power. As discussed above, this involves the output current and output voltage following an output power hyperbola and may be considered as a constant power mode of operation.

At step 410, the output voltage reaches the desired constant output voltage level. As the load continues to increase, the converter operates in constant voltage mode, with a decreasing current, at step 412. During operation at step 412, the switch of the converter is operated such that either or both of the switching frequency ($f_{switch}$) and peak primary current ($I_{peak}$) 1 are decreased from their maximum values.

Figure 5:
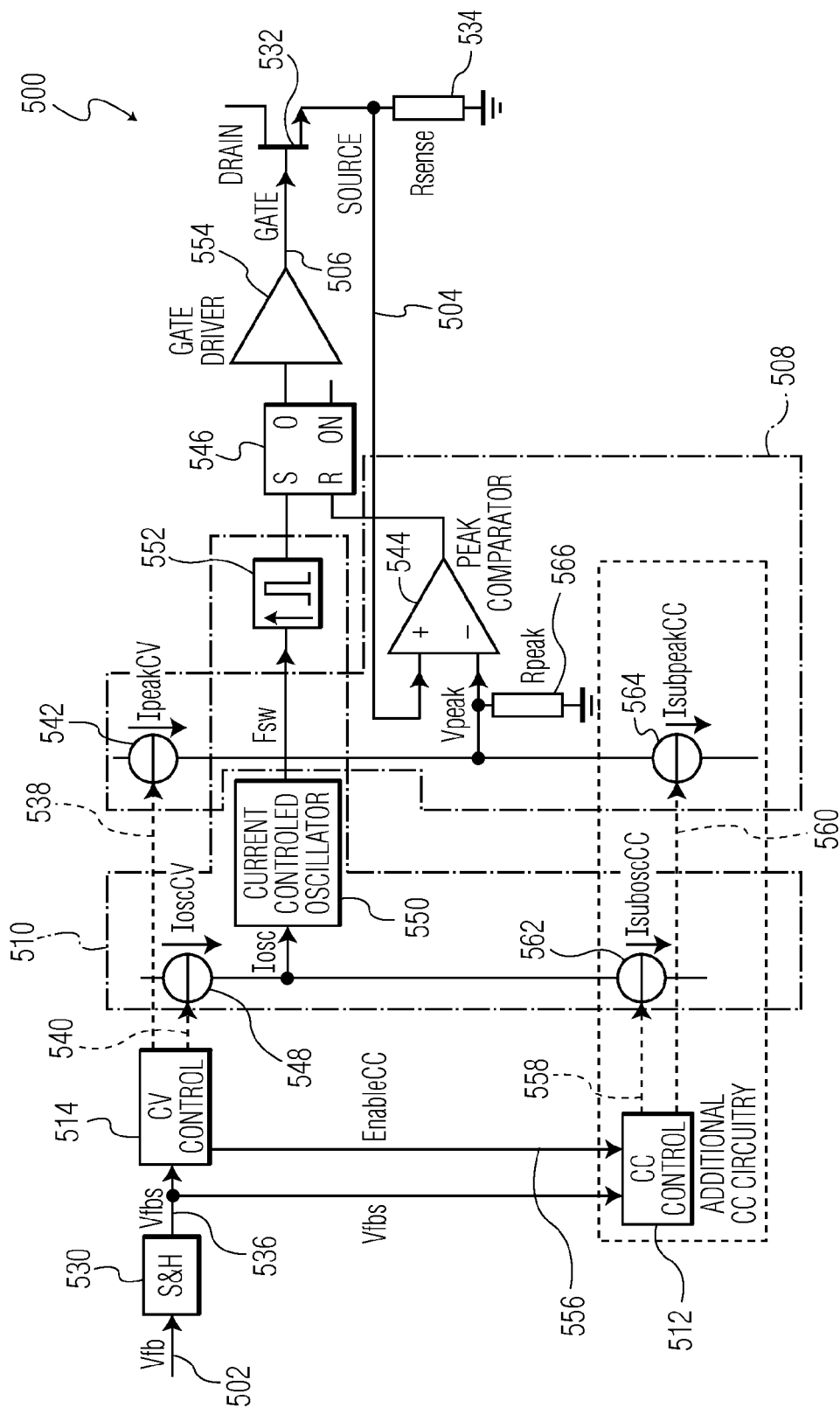
FIG. 5 illustrates a controller according to another embodiment of the invention.
Figure 6:
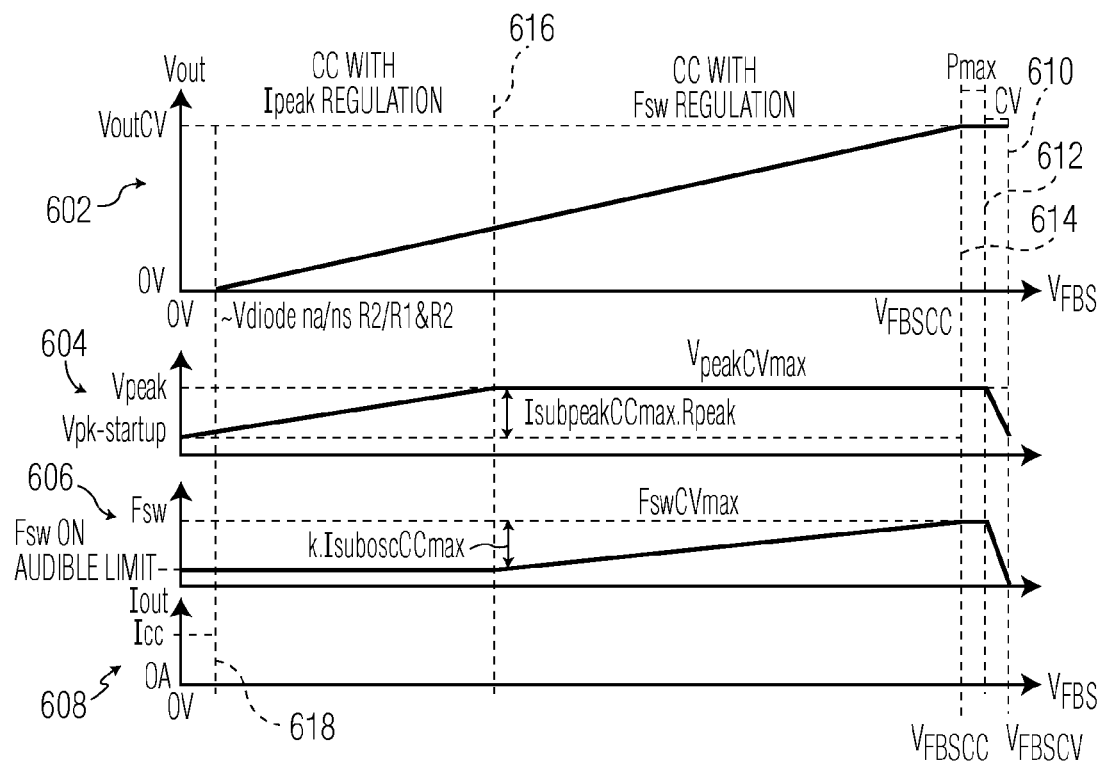
FIG. 6 illustrates graphically an example operation of the controller of FIG. 4.

FIG. 5 illustrates a controller 500 according to an embodiment of the invention. FIG. 6 illustrates graphically the performance of the controller 500 of FIG. 5.

FIG. 6 shows four graphs:
  graph 602 illustrates the relationship between the sampled sensed voltage input signal 536 ($V_{FBS}$) and output voltage of the flyback converter ($V_{out}$);
  graph 604 illustrates the relationship between the sampled sensed voltage input signal 536 ($V_{FBS}$) and the peak primary voltage ($V_{peak}$). It will be appreciated that $V_{peak}$ is proportional to the peak primary current ($I_{peak}$);
  graph 606 illustrates the relationship between the sampled sensed voltage input signal 536 ($V_{FBS}$) and switching frequency; and
  graph 608 illustrates the relationship between the sampled sensed voltage input signal 536 ($V_{FBS}$) and the output current of the flyback converter ($I_{out}$).

The controller receives a $V_{FB}$ input signal 502, which is an example of a sensed voltage input signal, and a $V_{primary}$ input signal 504, which is an example of a signal representative of the current in the primary winding of the transformer. The value for the peak primary current ($I_{peak}$) equals the $V_{primary}$ input signal 504 divided by the value of the Rsense resistor 534.

The controller provides a switch control signal 506 to the gate of a field effect transistor 532. It will be appreciated that the Rsense resistor 534 that is connected between the source of the transistor 532 and ground can be a discrete component that is not part of the controller IC. This discrete Rsense resistor gives a design freedom for setting the maximum power as the division factor that is applied to the $V_{primary}$ input signal 504 in determining the peak primary current $I_{peak}$ can be defined by changing the resistance of the sense resistor Rsense 534. The components of the controller that are shown in FIG. 5 are therefore connected to four pins of the controller integrated circuit (IC): FB, GND, Drain and Source. It will be appreciated from a comparison with FIG. 1 that this embodiment of the invention does not need any additional pins provided on the controller IC. This is an advantageous feature of this embodiment of the invention.

In other examples, an internal sense resistor or a sense FET with an incorporated current mirror can be used instead of the discrete sense resistor Rsense 534.

The sensed voltage input signal $V_{FB}$ 502 is provided to a sample and hold component 530. The sample and hold component 530 is configured to sense $V_{FB}$ 502 at the end of the secondary stroke in order to provide a sampled voltage input signal $V_{FBS}$ 536.

The sampled voltage input signal $V_{FBS}$ 536 is provided as an input to a constant voltage (CV) controller 514. The CV controller 514 can process the sampled voltage input signal $V_{FBS}$ 536 in order to provide a control signal 510 to a switching frequency adjuster 510 and a control signal 538 to a peak current adjuster 508. The CV controller 514 adjusts the switching frequency and peak primary current so that the desired constant voltage is maintained during constant voltage mode.

The switching frequency adjuster 510 includes a variable current source ($I_{oscCV}$) 548 that is adjustable by the control signal 540 from the CV controller 514. The current from $I_{oscCV}$ 548 is provided as an input to a current controlled oscillator 550. The output of the current controlled oscillator 550 is representative of the desired switching frequency ($f_{switch}$) and is provided to a pulse generator 552. The output of the pulse generator 552 is provided as the set input to an SR flip-flop 546. The Q output of the SR flip-flop 546 is provided as an input to a gate driver amplifier 554, and the output of the gate driver amplifier 554 is the switch control signal 506. Controlling the set input of the SR flip-flop 546 in this way defines the period of time between the successive transitions in the switch control signal 506 from low to high and therefore sets when the switch 532 is turned on. This period of time represents the gap between successive primary strokes of the flyback converter and therefore represents the switching frequency of the flyback converter.

The peak current adjuster 508 includes a variable current source ($I_{peakCV}$) 542 that is adjustable by the control signal 538 from the CV controller 514. The current from $I_{peakCV}$ 542 is provided to a peak resistor Rpeak 566, such that the voltage that is dropped across Rpeak 566 is provided as an input to the inverting input of a comparator 544. This voltage is referred to as Vpeak in FIG. 5.

The non-inverting input of the comparator 544 is provided with the voltage 504 that is dropped across the sense resistor Rsense 530 due to current at the primary side of the transformer. This input signal 504 is therefore representative of an $I_{primary}$ input signal. The output of the comparator 544 is provided to the reset input of the SR flip-flop 546 in order to control when the switch control signal 506 goes low and therefore the proportion of the switching period for which a current is allowed to flow through the primary winding of the flyback converter. In this way, the peak current adjuster 508 sets when the switch is turned off.

Referring to the graphs of FIG. 6, and starting from the right-hand side of the graphs and moving towards the left, the graphs can be considered as illustrative of the performance of the converter as a battery is being charged and the load presented at the output of the converter changes. It can be seen that for operation of the converter for $V_{FBS}$ values between the two dashed lines 610, 612, the output voltage (graph 602) is constant, and the peak primary current (represented by graph 604), switching frequency (graph 606) and output current (graph 608) gradually increase. It will be appreciated that the peak primary current (graph 604) and switching frequency (graph 606) do not necessarily need to be increased linearly to maintain a constant output voltage.

In this embodiment, the CV controller 514 can ensure that the peak primary current and switching frequency are not increased to a value above their maximum values by keeping the respective control signals 538, 540 below maximum values. Operating with maximum values for the peak primary current and switching frequency causes the converter to provide a maximum power output. When the current drawn by the load of the converter increases such that the control signals 538, 540 are at their maximum values, the control signals 538, 540 are fixed at their maximum values and an EnableCC signal 556 that is output by the CV controller 514 is set.

Referring to the graphs of FIG. 6, operation at the maximum output power occurs between the dashed lines 612, 614 as the switching frequency (graph 606) and peak primary current (graph 604) are constant at their maximum values. The values for the output voltage (graph 602) and output current (graph 608) are substantially constant between 612 and 614, although in some embodiments there may be a small increase in output current and decrease in output voltage during the transition as shown in FIG. 3. At the instant represented by dashed line 612 the EnableCC signal 556 is set.

A constant current (CC) controller 512 receives the EnableCC signal 556 from the CV controller 514. The CC controller 512 also receives the $V_{FBS}$ signal 536 from the sample and hold component 530. The CC controller 512 is configured to provide control signals 558, 560 to the peak current adjuster 508 and switching frequency adjuster 510 in order to cause the converter to operate in constant current mode when (i) the EnableCC signal 556 is set; and (ii) the value of $V_{FBS}$ is less than the CC threshold level ($V_{FBSCC}$) for changing to constant current mode of operation. The instant of changeover to constant current mode of operation is identified with dashed line 614 in FIG. 6.

The control signal 558 that is provided by the CC controller 512 to the switching frequency adjuster 510 is used to control a variable current source $I_{suboscCC}$ 562. The variable current source $I_{suboscCC}$ 562 is in parallel with the corresponding variable current source $I_{oscCV}$ 548 that is controlled by the CV controller 514 such that the resultant current that is provided to the current controlled oscillator 550 is ($I_{oscCV}$-$I_{suboscCC}$). In this way, the CC controller 512 can be considered as being able to reduce the switching frequency from its maximum value when the converter is operating in constant current mode. When the converter is operating in a constant voltage mode of operation, $I_{suboscCC}$ is zero and therefore does not contribute to the operation of the converter. When the converter is operating in a constant current mode of operation, the control output signal 540 from the CV controller 514 maintains its maximum value.

The control signal 560 that is provided by the CC controller 512 to the peak current adjuster 508 is used to control a variable current source $I_{subpeakCC}$ 564. The variable current source $I_{subpeakCC}$ 564 is in parallel with the corresponding variable current source $I_{peakCV}$ 542 that is controlled by the CV controller 514 such that the resultant current that is provided to the inverting input of the comparator 544 is ($I_{peakCV}$-$I_{subpeakCC}$). In this way, the CC controller 512 can be considered as being able to reduce the peak primary current from its maximum value when the converter is operating in constant current mode. When the converter is operating in a constant voltage mode of operation, $I_{subpeakCC}$ is zero and therefore does not contribute to the operation of the converter. When the converter is operating in a constant current mode of operation, the control output signal 538 from the CV controller 514 maintains its maximum value.

It will be appreciated that the CC controller 612 can be configured to generate any control signals 558, 560 that together cause the output current of the converter to be kept constant. FIG. 6 will be used to describe one example whereby the switching frequency control signal 558 is initially adjusted instead of the peak current control signal 560 up until the switching frequency reaches a switching minimum value. In other embodiments, more sophisticated control algorithms may be employed such that the switching frequency control signal 558 and the peak current control signal 560 are adjusted together or in any way to provide the desired output values.

Referring to FIG. 6, and considering operation starting from dashed line 614 and moving from right to left, the switching frequency (graph 608) is gradually reduced from its maximum value (referred to as FswCVmax in FIG. 6, and this can be considered as equivalent to $f_{switch\text{-}max}$ that is discussed above) until it reaches a switching minimum value corresponding to an audible limit for the human ear at dashed line 616. That is, operation at a switching frequency less than the switching minimum value could potentially be heard by the human ear, which in some embodiments can be considered as an annoyance, is avoided.

As illustrated in FIG. 6, the difference between the maximum switching frequency (FswCVmax) and the reduced switching frequency in constant current mode is proportional to the value of the $I_{suboscCC}$ variable current source 562. The maximum value for the $I_{suboscCC}$ current source 562 is $I_{suboscCCmax}$, which represents operation at the audible limit. In this example, the CC controller 512 applies the threshold $I_{suboscCCmax}$ to the associated control signal 558 such that the audible threshold is not exceeded.

When the audible threshold is reached at dashed line 616 in FIG. 6, the switching frequency (graph 606) is kept constant for a further decreasing load, and the peak primary current (graph 604) is reduced in order to maintain the constant output current (graph 608).

Although a linear relationship between $V_{FBS}$ and Vpeak is illustrated in graph 604 for convenience, it will be appreciated from the above description and equations that Vpeak is reduced in accordance with the square root of $V_{FBS}$ in order to maintain a constant output current. That is (with Iout/(½·Lp·Fsw-max)):

$$V_{peak} = R_{sense} \cdot \sqrt{Iout/(\tfrac{1}{2} \cdot L_p \cdot f_{switch\text{-}max})} \cdot \sqrt{(V_{FBS} \cdot n_s/n_a \cdot (R1+R2)/R2)} = k_{Ipk} \cdot \sqrt{V_{FBS}}$$

As illustrated in FIG. 6, the difference between the maximum peak primary current (VpeakCVmax) and the reduced peak primary current in constant current mode is proportional to the value of the $I_{subpeakCC}$ variable current source 564. The maximum value for the $I_{subpeakCC}$ current source 564 is $I_{subpeakCCmax}$, which is multiplied by the value of the peak resistor (Rpeak shown in FIG. 5), and represents settings that can be used on startup of the converter when the output of the converter is zero.

Dashed line 618 represents zero output voltage (graph 602), and at this point $V_{FBS}$ represents the forward voltage of the secondary diode in FIG. 1.

Embodiments of the invention can have an accuracy that is based on the production tolerance of the Lp inductance of the primary winding of the transformer; this can have a dominant influence on the tolerance in the output current. In addition, the forward voltage of the secondary diode can cause a small and systematic difference between Vout and $V_{FBS} \cdot n_s/n_a \cdot (R1+R2)/R2$.

The embodiment of FIG. 5 can avoid a need for large constant current circuitry. It can be seen that the additional constant current circuitry of FIG. 5 includes the CC controller 512, and two variable current sources $I_{suboscCC}$ 562 and $I_{subpeakCC}$ 564. Furthermore, no additional pins are required on the controller IC. Implementations of the invention can be considered as requiring minimal additional circuitry to the constant voltage circuitry. The additional constant current circuitry can be considered as a transconductance control that is enabled at maximum power and translates the $V_{FBS}$ voltage into a subtraction current for the current controlled oscillator 550 and a subtraction current for the Vpeak control.

Figure 7:
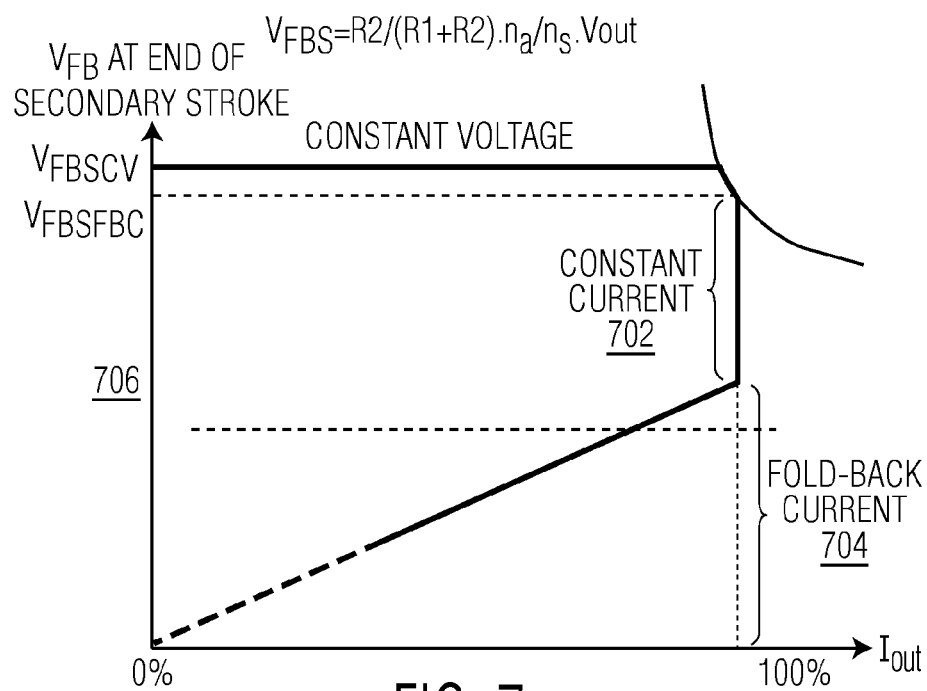
FIG. 7 illustrates graphically an example operation of a controller according to an embodiment of the invention.

FIG. 7 illustrates the relationship between the sensed voltage at the end of the secondary stroke ($V_{FBS}$) on the vertical axis and the output current ($I_{out}$) on the horizontal axis according to an embodiment of the invention. FIG. 7 differs from FIG. 3 as the switched mode power converter transitions from a constant current mode of operation 702 to a fold-back mode of operation 704 as $V_{FBS}$ decreases. In this example the transition to fold-back mode 704 occurs when $V_{FBS}$ reaches a fold-back threshold value 706. It will be appreciated that one or more of the other threshold levels for $V_{FBS}$ that are shown in FIG. 3 can also be used with the embodiment of FIG. 7.

The embodiment illustrated by FIG. 7 enables the output current to be regulated to a level that reduces with decreasing output voltage such that lower current is provided in short-circuit conditions.

The constant current mode of operation 702 may be considered as a regulated current mode that provides a substantially constant output current. The fold-back current mode of operation 704 may be considered as a regulated current mode that provides a substantially non-constant output current.

Embodiments of the invention can be considered as providing current source operation of a flyback converter that uses a maximum output power of the converter for transition between constant current and constant voltage modes of operation. Such operation can include decreasing the output power with a decreasing feedback voltage for constant current mode of operation.

Embodiments of the invention can avoid the need for any sensing of the secondary current or the input voltage, which is required in some prior art examples. The direct method of sensing the output current can involve adding a series resistor for current sensing in the output current loop at the secondary side. However, this can cause unwanted power dissipation and does not enable high efficiency SMPS applications to be provided. Furthermore, an opto-coupler can be needed for the communication of information from the secondary side of the converter to the controller at the primary side to maintain mains-isolation.

Embodiments of the invention can avoid the need for an integration capacitor. This can save a pin on the controller IC if an external component is to be used, and avoid integration of a large capacitor onto the IC if an external component is not to be used. Such embodiments of the invention can be considered as allowing a minimum or reduced area of silicon to be required for obtaining stable constant current operation.

It may be known in the art that an integration capacitor can be used to sense the secondary stroke time and control the primary peak current such that $I_{peak}$ is multiplied with $n_p/n_s \cdot \frac{1}{2} \cdot t_{sec}/T_{cycle}$ in order to provide the desired output current $I_{out}$. Such control can be implemented by comparing the charge $I_{peak} \cdot n_p/n_s \cdot \frac{1}{2} \cdot t_{sec}$ with the charge $I_{out} \cdot T_{cycle}$. However, an additional control circuit for CC mode is required, and if good accuracy is needed, then an accurate reconstruction of the maximum $I_{peak}$ and an accurate determination of the end of the secondary stroke is required. This can require complex circuitry in the prior art.

Another indirect method of sensing the output current that can be avoided by using embodiments of the invention is using the primary stroke time (that equals the conduction-time of the power switch) and sensing the input voltage. For a flyback converter this means measuring the time of the primary stroke and controlling the primary peak current such that $I_{peak}$ multiplied with $V_{in}/V_{out} \cdot \frac{1}{2} \cdot t_{prim}/T_{cycle}$ equals the desired $I_{out}$. A disadvantage is the need for multiplier circuitry and the need to sense the input voltage via sampling of the FB voltage in the primary stroke or sensing directly at the cost of a pin and bleeder current.

The constant current mode of operation that is provided by one or more embodiments of the invention disclosed herein can be provided without interference with a constant voltage mode operation. This can be due to the constant voltage mode (which may also be referred to as voltage source operation) ends once the primary peak current and switching frequency are at their maximum values. The constant current mode (which may be referred to as current source operation) can be enabled at any point on the lower part of the maximum output power hyperbola. Setting the output current can follow automatically from setting the maximum output power.

Examples of the invention can be considered as providing a transition to a constant current mode of operation from a position on a maximum output power hyperbola by reducing the switching frequency and/or the primary peak current based on the sampled output voltage on the FB pin of the controller.

The constant current mode can be enabled at maximum power point with maximum primary peak current and maximum switching frequency. In constant current mode the sampled feedback voltage can directly modulate the $f_{switch}$ and $I_{peak}$ parameters. The $f_{switch}$ reduction can start at a $V_{FBS}$ voltage that drops below a $V_{FBSCC}$ threshold level and end at the audible level, followed by an $I_{peak}$ reduction until a minimum $I_{peak}$ level at zero $V_{FBS}$ voltage.

Embodiments herein can relate to a constant current regulator for $f_{switch}$ and $I_{peak}$ reduction.

Embodiments of the invention can be applied to switch mode power supplies that are used for battery chargers and for drivers that should deliver constant output current to a load, as non-limiting examples.

Embodiments of the invention can be considered as relating to a control method for a switched mode power converter for supplying a regulated output current:

That uses the maximum output power of the converter by detecting if the switching frequency and the primary peak current are operating on their maximum value in constant voltage mode for transition to a constant current mode.

That regulates the output power by the sensed feedback voltage.

That lowers the output power with lower feedback voltage.

In addition, embodiments of the invention can be considered as relating to a control method for a switched mode power converter for supplying a regulated output current:

That uses a voltage threshold level on the feedback voltage below the constant voltage level for transition to a constant current mode.

That regulates the output power by the sensed feedback voltage.

That lowers the output power with lower feedback voltage.

Lowering the output power with lower feedback voltage can be regulated by:

Decreasing the $f_{switch}$ with decreasing $V_{FBS}$ according to a predefined relation.

Decreasing the $I_{peak}$ with decreasing $V_{FBS}$ according to a predefined relation.

Decreasing the $f_{switch}$ and $I_{peak}$ with decreasing $V_{FBS}$ according to a predefined relation.

Lowering the output power with lower feedback voltage can have:

A minimum $f_{switch}$ above the audible border.

A minimum $I_{peak}$ for guaranteed start-up.

The invention claimed is:

1. A controller for a switched mode power converter having a switch, wherein the switched mode power converter can operate in a constant current mode of operation and a constant voltage mode of operation, the controller is configured to output a switch control signal for the switch and receive a sensed voltage input signal and a primary current input signal, wherein the controller comprises:

a constant current mode controller configured to process the sensed voltage input signal and generate a first plurality of output control signals for controlling at least one of peak current and switching frequency operational parameters of the switched mode power converter;

a constant voltage mode controller configured to process the sensed voltage input signal and generate a second plurality of output control signals for controlling at least one of the peak current and switching frequency operational parameters of the switched mode power converter;

a primary peak current adjuster configured to process the primary current input signal, at least one of the first plurality of output control signals from the constant current mode controller, and at least one of the second plurality of output control signals from the constant voltage mode controller in order to configure the switch control signal to turn off the switch; and a switching frequency adjuster configured to process at least one of the first plurality of output control signals from the constant current mode controller and the second plurality of output signals from the constant voltage mode controller in order to configure the switch control signal to turn on the switch, wherein the controller is configured to enable the constant current mode controller if the second plurality of output control signals of the constant voltage mode controller represent an operation with peak current and switching frequency at maximum values, and a constant power mode of operation occurs during transitions to and from the constant current mode of operation and a constant voltage mode of operation, and both the constant voltage mode controller and the constant current mode controller control both the primary peak current adjuster and the switching frequency adjuster.

2. The controller of claim 1, wherein the controller is configured to enable the constant voltage mode controller if the first plurality of output control signals of the constant current mode controller represent the operation with peak current and switching frequency at maximum values.

3. The controller of claim 1, wherein the primary peak current adjuster is configured to provide the switch control signal such that it is configured to turn off the switch in order to provide an operation with a constant peak current at the maximum value.

4. The controller of claim 1, configured to enable the constant current controller when the second plurality of output control signals of the constant voltage mode controller represent the operation with the switching frequency and primary peak current at maximum values, and the sensed voltage input signal drops to a CC threshold level that is below a voltage level when the switched mode power converter is operating in the constant voltage mode.

5. The controller of claim 1, wherein the controller is configured to operate the switched mode power converter with the maximum values for the switching frequency and primary peak current at a transition between the constant current mode of operation and the constant voltage mode of operation.

6. The controller of claim 1, wherein the switched mode power converter can operate in a regulated current mode of operation, and the controller further comprises:
    a regulated current mode controller that comprises the constant current mode controller configured to generate the first plurality of output control signals for controlling at least one of the peak current and switching frequency operational parameters of the switched mode power converter such that the output current is maintained substantially constant for sensed voltage input signal levels between a CC threshold level and a fold-back threshold level; and
    a fold-back controller configured to generate a third plurality of output control signals for controlling at least one of the peak current and switching frequency operational parameters of the switched mode power converter such that the output current is reduced as the sensed voltage input signal reduces for sensed voltage input signal levels below the fold-back threshold level.

7. The controller of claim 1, wherein the constant current mode controller is configured to generate the first plurality of output control signals for the switching frequency adjuster and the primary peak current adjuster such that the switching frequency is adjusted for switching frequency values that are above a switching minimum value and the primary peak current is kept constant.

8. The controller of claim 7, wherein the constant current mode controller is configured to generate the first plurality of output control signals for the switching frequency adjuster and the primary peak current adjuster such that the switching frequency is kept constant at the switching minimum value and the primary peak current is adjusted when the switching frequency reaches the switching minimum value.

9. The controller of claim 1, wherein the primary peak current adjuster is configured to set an on-time of the switch control signal.

10. The controller of claim 1, wherein the primary peak current adjuster is configured to adjust the peak current in accordance with the second plurality of output control signals from the constant voltage mode controller when the switched mode power converter operates in the constant voltage mode of operation.

11. The controller of claim 1, wherein the primary peak current adjuster is configured to adjust the peak current in accordance with simultaneously both the first plurality of output control signals from the constant current mode controller and the second plurality of output control signals from the constant voltage mode controller when the switched mode power converter operates in the constant current mode of operation.

12. A controller for a switched mode power converter having a switch, wherein the switched mode power converter can operate in a constant current mode of operation and a constant voltage mode of operation, the controller is configured to output a switch control signal for the switch and receive a sensed voltage input signal and a primary current input signal, wherein the controller comprises:
    a constant current mode controller configured to process the sensed voltage input signal and generate a first plurality of output control signals for controlling at least one of peak current and switching frequency operational parameters of the switched mode power converter;
    a constant voltage mode controller configured to process the sensed voltage input signal and generate a second plurality of output control signals for controlling at least one of the peak current and switching frequency operational parameters of the switched mode power converter;
a primary peak current adjuster configured to process the primary current input signal, at least one of the first plurality of output control signals from the constant current mode controller, and at least one of the second plurality of output control signals from the constant voltage mode controller in order to configure the switch control signal to turn off the switch, wherein the primary peak current adjuster comprises: a first variable current source that is controllable by the constant voltage mode controller; and a second variable current source that is controllable by the constant current mode controller, wherein the first and second variable current sources are in parallel with each other and a current from the second variable current source is configured to be subtracted from a current of the first variable current source in order to adjust the primary peak current in the constant current mode of operation; and
    a switching frequency adjuster configured to process at least one of the first plurality of output control signals from the constant current mode controller and the second plurality of output signals from the constant voltage mode controller in order to configure the switch control signal to turn on the switch, wherein the controller is configured to enable the constant current mode controller if the second plurality of output control signals of the constant voltage mode controller represent an operation with peak current and switching frequency at maximum values, and a constant power mode of operation occurs during transitions to and from the constant current mode of operation and a constant voltage mode of operation.

13. The controller of claim 1, wherein the switching frequency adjuster is configured to adjust the switching frequency in accordance with the second plurality of output control signals from the constant voltage controller when the switched mode power converter operates in the constant voltage mode of operation.

14. The controller of claim 1, wherein the switching frequency adjuster is configured to adjust the switching frequency in accordance with both the second plurality of output control signals from the constant voltage mode controller and the first plurality of output control signals from the constant current mode controller when the switched mode power converter operates in the constant current mode of operation.

15. A controller for a switched mode power converter having a switch, wherein the switched mode power converter can operate in a constant current mode of operation and a constant voltage mode of operation, the controller is configured to output a switch control signal for the switch and receive a sensed voltage input signal and a primary current input signal, wherein the controller comprises:

a constant current mode controller configured to process the sensed voltage input signal and generate a first plurality of output control signals for controlling at least one of peak current and switching frequency operational parameters of the switched mode power converter;

a constant voltage mode controller configured to process the sensed voltage input signal and generate a second plurality of output control signals for controlling at least one of the peak current and switching frequency operational parameters of the switched mode power converter;

a primary peak current adjuster configured to process the primary current input signal, at least one of the first plurality of output control signals from the constant current mode controller, and at least one of the second plurality of output control signals from the constant voltage mode controller in order to configure the switch control signal to turn off the switch; and a switching frequency adjuster configured to process at least one of the first plurality of output control signals from the constant current mode controller and the second plurality of output signals from the constant voltage mode controller in order to configure the switch control signal to turn on the switch, wherein the controller is configured to enable the constant current mode controller if the second plurality of output control signals of the constant voltage mode controller represent an operation with peak current and switching frequency at maximum values, and a constant power mode of operation occurs during transitions to and from the constant current mode of operation and a constant voltage mode of operation, wherein the switching frequency adjuster comprises: a first variable current source that is controllable by the constant voltage mode controller; and a second variable current source that is controllable by the constant current mode controller, wherein the first and second variable current sources are in parallel with each other and a current from the second variable current source is configured to be subtracted from a current of the first variable current source in order to adjust the switching frequency in the constant current mode of operation.

16. The controller of claim 1, wherein the switching frequency adjuster is configured to provide the switch control signal such that it is configured to turn on the switch with a constant frequency at the maximum value.

17. The controller of claim 1, wherein an operation margin is provided between an end of the constant voltage mode and a start of the constant current mode.

18. The controller of claim 1, wherein the output current and the output voltage follow an output power hyperbola in the constant power mode of operation.

19. The controller of claim 7, wherein the switching minimum value corresponds to an audible limit for a human ear.

20. The controller of claim 1, wherein the constant current mode can be enabled at any point on a lower part of a maximum output power hyperbola.

* * * * *